United States Patent
Ambe et al.

(10) Patent No.: US 7,099,315 B2
(45) Date of Patent: *Aug. 29, 2006

(54) METHOD AND APPARATUS FOR ENABLING L3 SWITCHING BY A NETWORK SWITCH IN A STACKING ENVIRONMENT

(75) Inventors: Shekhar Ambe, San Jose, CA (US); Mohan Kalkunte, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 847 days.

This patent is subject to a terminal disclaimer.

(21) Appl. No.: 09/955,985

(22) Filed: Sep. 20, 2001

(65) Prior Publication Data

US 2002/0057685 A1   May 16, 2002

(51) Int. Cl.
- *H04L 12/50* (2006.01)
- *H04L 12/28* (2006.01)
- *H04L 12/56* (2006.01)
- *H04Q 11/00* (2006.01)
- *H04J 3/26* (2006.01)
- *H04L 5/22* (2006.01)

(52) U.S. Cl. .................. 370/386; 370/390; 370/392; 370/432

(58) Field of Classification Search ........... 370/338, 370/349, 389, 390–394, 400, 401, 432, 465, 370/468, 471, 474, 232, 253; 709/238, 246, 709/249, 251; 710/1, 3, 4, 9, 11, 60
See application file for complete search history.

(56) References Cited

U.S. PATENT DOCUMENTS

| | | | |
|---|---|---|---|
| 5,278,689 A * | 1/1994 | Gitlin et al. ............ | 398/54 |
| 6,154,462 A * | 11/2000 | Coden ................... | 370/403 |
| 6,226,292 B1 * | 5/2001 | DiPlacido .............. | 370/395.7 |
| 6,343,078 B1 * | 1/2002 | Bronstein et al. ....... | 370/400 |
| 6,389,030 B1 * | 5/2002 | Coden ................... | 370/404 |
| 6,396,841 B1 * | 5/2002 | Co et al. ................ | 370/401 |
| 6,512,768 B1 * | 1/2003 | Thomas .................. | 370/389 |

(Continued)

FOREIGN PATENT DOCUMENTS

WO   WO 99/09713   2/1999

(Continued)

OTHER PUBLICATIONS

R. Breyer et al, "Switched, Fast and Gigabit Ethernet", 1999, MacMillan Technical Publishing, USA, XP002199222, pp. 187-202.

Primary Examiner—Chirag Shah
(74) Attorney, Agent, or Firm—Squire, Sanders & Dempsey L.L.P.

(57) ABSTRACT

A method of handling data packets in a series of network switches is disclosed. An incoming data packet is received at a data port of a first switch of the series of network switches and a stack tag is resolved from a header of the incoming data packet. It is then deterrmined whether an incoming data packet is a unicast packet, a multicast packet or an IP multicast packet; and the address resolution lookup and layer three IP lookup tables are searched to find an egress port for the incoming data packet. The packet header is modified and the packet is forwarded to at least a second switch of the series of network switches, on a stacked connection operating at a first data rate, based on the stack tag and the egress port. The header is later remodified when the egress port is one of a series of data ports of a particular switch of the series of switches.

8 Claims, 4 Drawing Sheets

U.S. PATENT DOCUMENTS

| | | | |
|---|---|---|---|
| 6,570,875 B1 * | 5/2003 | Hegde | 370/389 |
| 6,628,646 B1 * | 9/2003 | Angle et al. | 370/355 |
| 6,711,161 B1 * | 3/2004 | Erimli | 370/360 |
| 6,735,198 B1 * | 5/2004 | Edsall et al. | 370/389 |
| 6,757,279 B1 * | 6/2004 | Furlong et al. | 370/387 |
| 6,765,914 B1 * | 7/2004 | Jain et al. | 370/395.31 |
| 6,785,272 B1 * | 8/2004 | Sugihara | 370/386 |
| 6,785,286 B1 * | 8/2004 | O'Keeffe et al. | 370/397 |
| 6,801,527 B1 * | 10/2004 | O'Keeffe et al. | 370/386 |
| 6,813,268 B1 * | 11/2004 | Kalkunte et al. | 370/392 |
| 6,850,521 B1 * | 2/2005 | Kadambi et al. | 370/389 |

FOREIGN PATENT DOCUMENTS

| WO | WO 99/29072 | 6/1999 |
|---|---|---|
| WO | WO 00/72533 A1 | 11/2000 |

* cited by examiner

METHOD AND APPARATUS FOR ENABLING L3 SWITCHING BY A NETWORK SWITCH IN A STACKING ENVIRONMENT

BACKGROUND OF THE INVENTION

1. Field of the Invention

The invention relates to an apparatus for high performance switching in local area communications networks such as token ring, ATM, Ethernet, Fast Ethernet, 1 gigabit and 10,000 Mbits/s Ethernet environments, generally known as LANs. In particular, the invention relates to a method and apparatus for enabling L3 switching in a stacking environment.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards.

Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to Ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network.

Basic Ethernet wirespeed is up to 10 megabits per second, and Fast Ethernet is up to 100 megabits per second. The newest Ethernet is referred to as 10,000 Mbits/s Ethernet, and is capable of transmitting data over a network at a rate of up to 10,000 megabits per second. As speed has increased, design constraints and design requirements have become more and more complex with respect to following appropriate design and protocol rules and providing a low cost, commercially viable solution. For example, when switches are stacked, i.e. interconnected by a single link between "adjacent" switches, switching of incoming data based on the L3 level of the OSI model is made more complicated in that the correct destination module (switch) must be determined for the switching to be properly affected.

However, prior art switches and systems have limitations that can impede the overall effectiveness of such switching and can adversely affect the operational speed of a switch. Thus, there is a need to provide L3 switching of switched data through a network switch that does not impede the processing of data by that switch.

SUMMARY OF THE INVENTION

The present invention is directed to a switch-on-chip solution for a switch, capable of using Ethernet, Fast Ethernet, 1 gigabit and 10,000 Mbits/s Ethernet systems, wherein all of the hardware is disposed on a single microchip. The present invention is also directed to methods employed to enable and control access on a network switch.

The present invention is specifically directed to a method of handling data packets in an environment where multiple network switches are stacked together in configurations that allows data packets to be switched among ports of those network switches. The types of network switches have differing capacities and employ different styles of stacking of the switches. The present invention allows for the seamless transfer of packets in configurations where mixed types of switches are stacked using multiple stacking styles.

A method of handling data packets in a series of network switches is disclosed. An incoming data packet is received at a data port of a first lower capacity switch of the series of network switches and a stack tag is resolved from a header of the incoming data packet. The incoming data packet is forwarded to a first higher capacity switch, on a first stacked connection operating at a first data rate, based on the stack tag. A destination address of said incoming data packet is resolved by the first higher capacity switch and the header of the incoming packet is modified. The incoming data packet is forwarded to a second higher capacity switch, on a second stacked connection operating at a second data rate, based on the resolved destination address, where the header of the incoming data packet is modified and the incoming data packet is forwarded to a second lower capacity switch on a third stacked connection operating at the first data rate. Lastly, an egress port of the second lower capacity switch is determined based on the stack tag and the incoming data packet is forwarded to the egress port.

In the method of handling data packets, the step of modifying the header of the incoming packet includes adding or removing a stack tag to or from the header to be evaluated by the first and second higher capacity switches. The method can further include a step of resolving a mirroring field of the incoming data packet and forwarding the incoming data packet to a mirroring port based on the mirroring field. In addition, the second data rate may be four times the first data rate.

The present invention is also directed to a network switch for network communications. The switch has a first data port interface, supporting at least one data port transmitting and receiving data at a first data rate and a second data port interface, supporting at least one data port transmitting and receiving data at a second data rate, different from the first data rate. The switch also has a memory communicating with the first and second data port interfaces and a memory management unit for communicating data from the first and second data port interfaces and the memory. A communication channel communicates data and messaging information between the data port interfaces, and the memory management unit. The first data port interface is configured to communicate with lower capacity network switches at the first data rate and the second data port interface is configured to communicate with higher capacity network switches at the second data rate. The switch is configured to resolve a stack tag from a header of an incoming data packet and forward the incoming data packet to one of the lower and higher capacity network switches based on the resolved stack tag. Additionally, the second data rate may be four times the first data rate and the switch may be configured to modify the header of the incoming data packet before forwarding the incoming data packet to one of the higher capacity network switches.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

The methods and apparatuses of the present invention are directed to enabling proper L3 switching for network switches in a stacked configuration. The general structure of a network switch embodying the present invention is discussed, the different types of stacking are described and the flow of data through the stacked network switches are described in more detail below.

Figure 1:
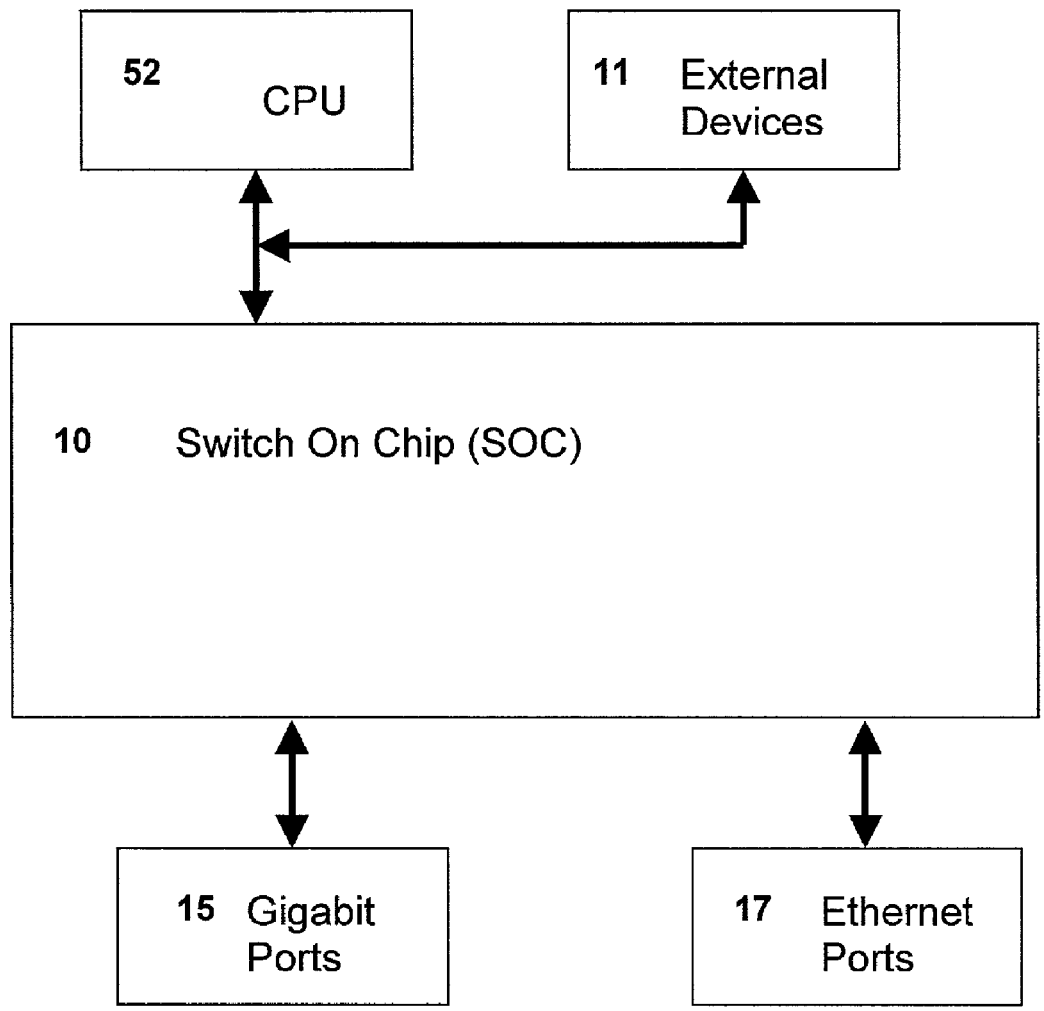
FIG. 1 is a general block diagram of elements of the present invention.

FIG. 1 illustrates a configuration wherein a switch-on-chip (SOC) 10, in accordance with the present invention, is functionally connected to external devices 11, a central processing unit (CPU) 52, Gigabit Ethernet ports 15, and Ethernet ports 17. For the purposes of this embodiment, the Gigabit Ethernet ports 15, which are high speed Ethernet ports, are capable of operating at 1000 Mbps, but are also capable of operating at speeds ranging from 10 Mbps to 100 Mbps. While the switch on chip is shown as being connected to Ethernet ports as well, embodiments of this invention are applicable to switches that connect only to Gigabit Ethernet ports. External devices 11 could include other switching devices for expanding switching capabilities, or other devices as may be required by a particular application. CPU 52 can be used as necessary to program SOC 10 with rules which are appropriate to control packet processing. However, once SOC 10 is appropriately programmed or configured, SOC 10 operates, as much as possible, in a free running manner without communicating with CPU 52. Because CPU 52 does not control every aspect of the operation of SOC 10, CPU 52 performance requirements, at least with respect to SOC 10, are fairly low. A less powerful and therefore less expensive CPU 52 can therefore be used when compared to known network switches.

It should be noted that any number of Gigabit Ethernet ports 15 or Ethernet ports 17 can be provided. In one embodiment, 8 Gigabit ports 15 can be provided. Similarly, additional interconnect links to additional external devices 11 and CPUs 52 may be provided as necessary.

SOC 10 includes a plurality of Ethernet Port Interface Controllers (EPIC) 20a, 20b, 20c, etc., a plurality of Gigabit Port Interface Controllers (GPIC) 30a, 30b, etc., a CPU Management Interface Controller (CMIC) 40, a Common Buffer Memory Pool (CBP) 50, a Pipelined Memory Management Unit (PMMU) 70, including a Common Buffer Manager (CBM) 71, and a system-wide bus structure referred to as CPS channel 80. The PMMU 70 communicates with external memory 12, which includes a Global Buffer Memory Pool (GBP) 60. The CPS channel 80 comprises C channel 81, P channel 82, and S channel 83.

Figure 2:
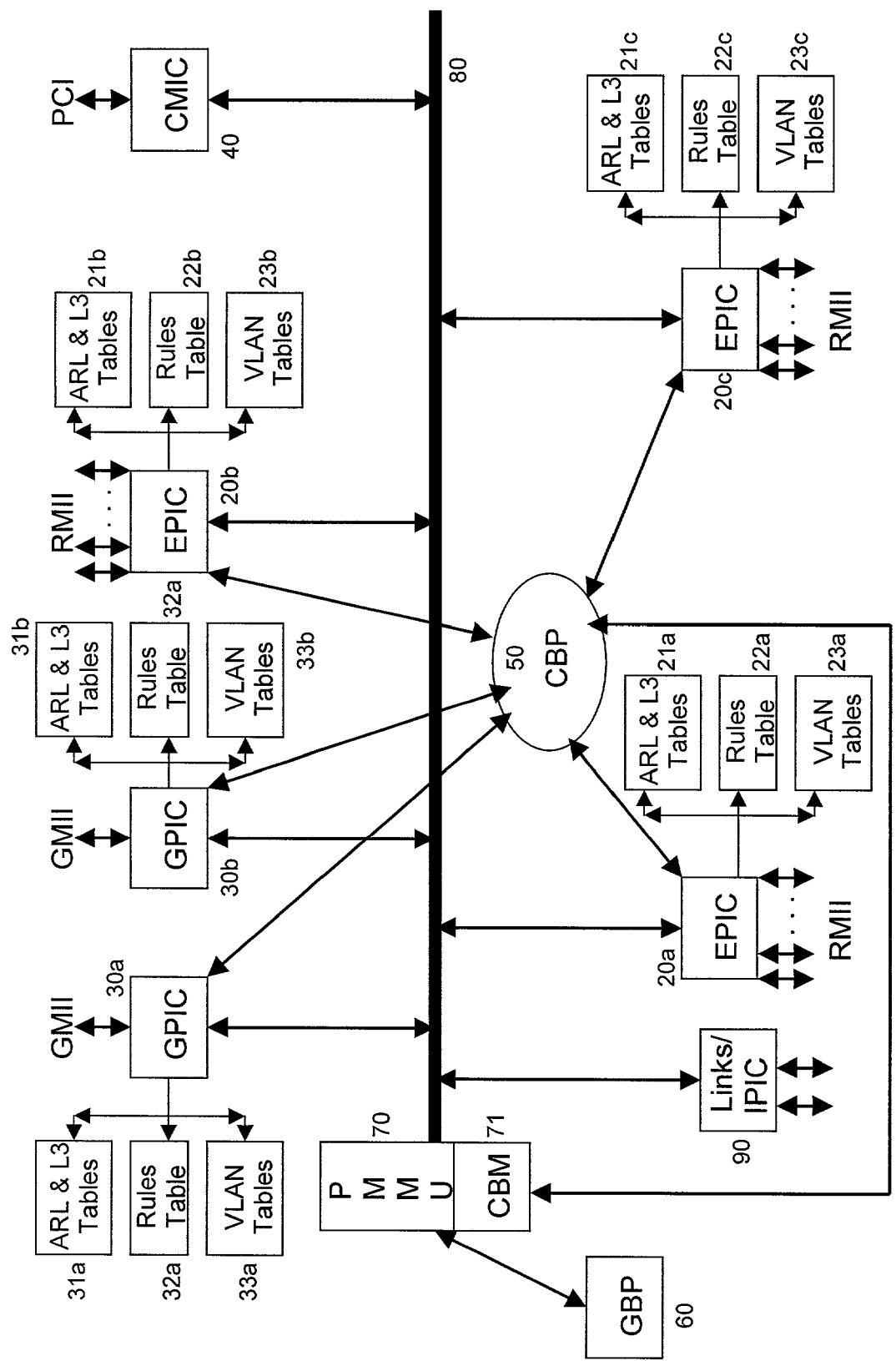
FIG. 2 is block diagram of elements of the switch on chip of the present invention.

The CPS channel is also referred to as the Cell Protocol Sideband Channel, and is a 17 Gbps channel which glues or interconnects the various modules together. As also illustrated in FIG. 2, other high speed interconnects can be provided, as shown as an extendible high speed interconnect. In one embodiment of the invention, this interconnect can be in the form of an interconnect port interface controller (IPIC) 90, which is capable of interfacing CPS channel 80 to external devices 11 through an extendible high speed interconnect link.

As will be discussed below, each EPIC 20a, 20b, and 20c, generally referred to as EPIC 20, and GPIC 30a and 30b, generally referred to as GPIC 30, are closely interrelated with appropriate address resolution logic and layer three switching tables 21a, 21b, 21c, 31a, 31b, rules tables 22a, 22b, 22c, 31a, 31b, and VLAN tables 23a, 23b, 23c, 31a, 31b. These tables will be generally referred to as 21, 31, 22, 32, 23, 33, respectively. These tables, like other tables on SOC 10, are implemented in silicon as two-dimensional arrays.

In a preferred embodiment of the invention, each EPIC 20 supports 8 fast Ethernet ports 13, and switches packets to and/or from these ports as may be appropriate. The ports, therefore, are connected to the network medium (coaxial, twisted pair, fiber, etc.) using known media connection technology, and communicates with the CPS channel 80 on the other side thereof. The interface of each EPIC 20 to the network medium can be provided through a Reduced Media Internal Interface (RMII), which enables the direct medium connection to SOC 10. As is known in the art, auto-negotiation is an aspect of fast Ethernet, wherein the network is capable of negotiating a highest communication speed between a source and a destination based on the capabilities of the respective devices. The communication speed can vary, as noted previously, between 10 Mbps and 100 Mbps; auto negotiation capability, therefore, is built directly into each EPIC module.

The address resolution logic (ARL) and layer three tables (ARL/L3) 21a, 21b, 21c, rules table 22a, 22b, 22c, and VLAN tables 23a, 23b, and 23c are configured to be part of or interface with the associated EPIC in an efficient and expedient manner, also to support wirespeed packet flow.

Each EPIC 20 has separate ingress and egress functions. On the ingress side, self-initiated and CPU-initiated learning of level 2 address information can occur. Address resolution logic is utilized to assist in this task. Address aging is built in as a feature, in order to eliminate the storage of address information which is no longer valid or useful. The EPIC also carries out layer 2 mirroring. A fast filtering processor (FFP) 141 (see FIG. 3) is incorporated into the EPIC, in order to accelerate packet forwarding and enhance packet flow. The ingress side of each EPIC and GPIC has a significant amount of complexity to be able to properly process a significant number of different types of packets which may come in to the port, for linespeed buffering and then appropriate transfer to the egress. Functionally, each port on each module of SOC 10 has a separate ingress submodule 14 associated therewith. From an implementation perspective, however, in order to minimize the amount of hardware implemented on the single-chip SOC 10, common hardware elements in the silicon will be used to implement a plurality of ingress submodules on each particular module. The configuration of SOC 10 discussed herein enables concurrent lookups and filtering, and therefore, processing of up to 6.6 million packets per second. Layer two lookups, Layer three lookups and filtering occur simultaneously to achieve this level of performance.

On the egress side, the EPIC is capable of supporting packet polling based either as an egress management or class of service (COS) function. Rerouting/scheduling of packets to be transmitted can occur, as well as head-of-line (HOL) blocking notification, packet aging, cell reassembly, and other functions associated with Ethernet port interface.

Each GPIC 30 is similar to each EPIC 20, but supports only one gigabit Ethernet port, and utilizes a port-specific ARL table, rather than utilizing an ARL table which is shared with any other ports. Additionally, instead of an RMII, each GPIC port interfaces to the network medium utilizing a gigabit media independent interface (GMII).

CMIC 40 acts as a gateway between the SOC 10 and the host CPU. The communication can be, for example, along a PCI bus, or other acceptable communications bus. CMIC 40 can provide sequential direct mapped accesses between the host CPU 52 and the SOC 10. CPU 52, through the CMIC 40, will be able to access numerous resources on SOC 10, including MIB counters, programmable registers, status and control registers, configuration registers, ARL tables, port-based VLAN tables, IEEE 802.1q VLAN tables, layer three tables, rules tables, CBP address and data memory, as well as GBP address and data memory. Optionally, the CMIC 40 can include DMA support, DMA chaining and scatter-gather, as well as master and target PCI64.

Common buffer memory pool or CBP 50 can be considered to be the on-chip data memory. In one embodiment of the invention, the CBP 50 is first level high speed SRAM memory, to maximize performance and minimize hardware overhead requirements. The CBP can have a size of, for example, 720 kilobytes running at 132 MHz. Packets stored in the CBP 50 are typically stored as cells, rather than packets. As illustrated in the figure, PMMU 70 also contains the Common Buffer Manager (CBM) 71 thereupon. CBM 71 handles queue management, and is responsible for assigning cell pointers to incoming cells, as well as assigning common packet IDs (CPID) once the packet is fully written into the CBP. CBM 71 can also handle management of the on-chip free address pointer pool, control actual data transfers to and from the data pool, and provide memory budget management.

Global memory buffer pool or GBP 60 acts as a second level memory, and can be located on-chip or off chip. In the preferred embodiment, GBP 60 is located off chip with respect to SOC 10. When located off-chip, GBP 60 is considered to be a part of or all of external memory 12. As a second level memory, the GBP does not need to be expensive high speed SRAMs, and can be a slower less expensive memory such as DRAM. The GBP is tightly coupled to the PMMU 70, and operates like the CBP in that packets are stored as cells. For broadcast and multicast messages, only one copy of the packet is stored in GBP 60.

As shown in the figure, PMMU 70 is located between GBP 60 and CPS channel 80, and acts as an external memory interface. In order to optimize memory utilization, PMMU 70 includes multiple read and write buffers, and supports numerous functions including global queue management, which broadly includes assignment of cell pointers for rerouted incoming packets, maintenance of the global FAP, time-optimized cell management, global memory budget management, GPID assignment and egress manager notification, write buffer management, read prefetches based upon egress manager/class of service requests, and smart memory control.

Differing stacking configurations of the SOCs will now be discussed. Specifically, two types of configurations are allowed. The first, illustrated in FIG. 3, has a uni-directional ring or a simplex link interconnection. The second, illustrated in FIG. 4, has a bi-directional ring or a full-duplex interconnection.

Figure 3:
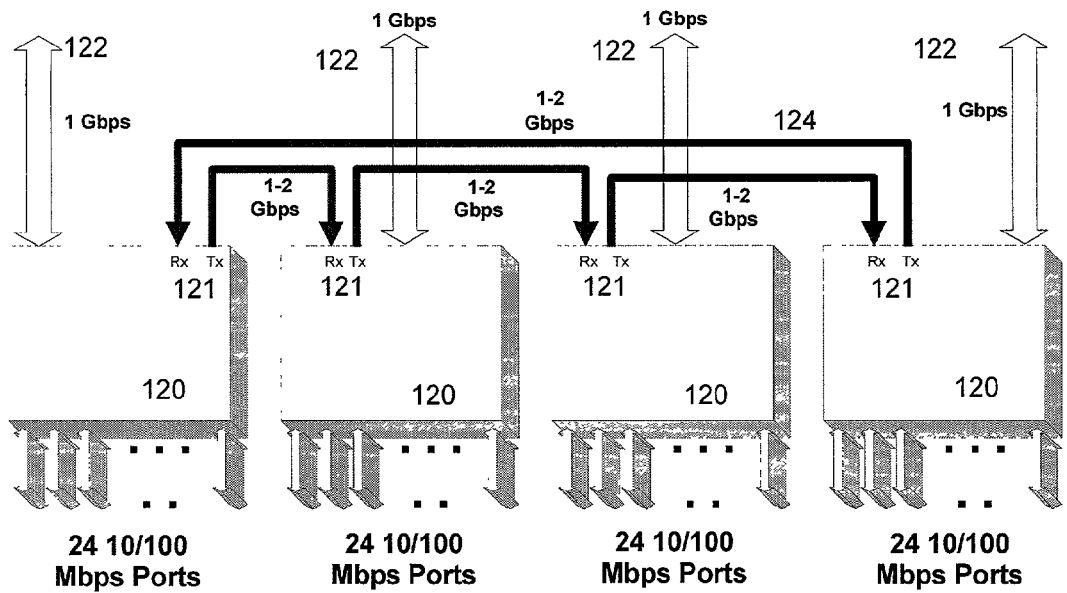
FIG. 3 illustrates an example of stacking of switches in a simplex connection.

FIG. 3 illustrates the interconnection of 4 SOCs 120 but it is noted that such stacking configurations are not limited to that number of devices. Up to 32 devices can be interconnected to form a single stacking solution. In the simplex link interconnection configuration, only one Gigabit port is configured as a stacking port in a simplex interconnection 124. Although either port can be configured as a stacking link port, it is recommended to configure only one as a stacking link port.

In this type of interconnection, the transmit port of one module 121 is connected to the receive port 121 of another module in a cascaded fashion. The transmit port 121 of the last module is connected to the receive port 121 of the first module such that a unidirectional link is created. In this type of configuration, only one stacking port is used for the interconnection, with the other Gigabit port being available for uplink connectivity. The specific embodiment of the present invention illustrated in FIG. 3 shows a solution of 96 10/100 ports with four Gigabit ports for uplink connections to servers or other switches.

In the above discussed configuration, the packet flow is unidirectional. For example, a packet from a port in the first module destined to a port in the last module will traverse the intermediate modules. The total number of ports available in the stacking solution is n*(24 FE+1 Gig), where n is the number of stacked devices. The unidirectional interconnection architecture is very beneficial in networking environments where the number of uplinks is crucial to the proper functioning of the switch assembly.

Figure 4:
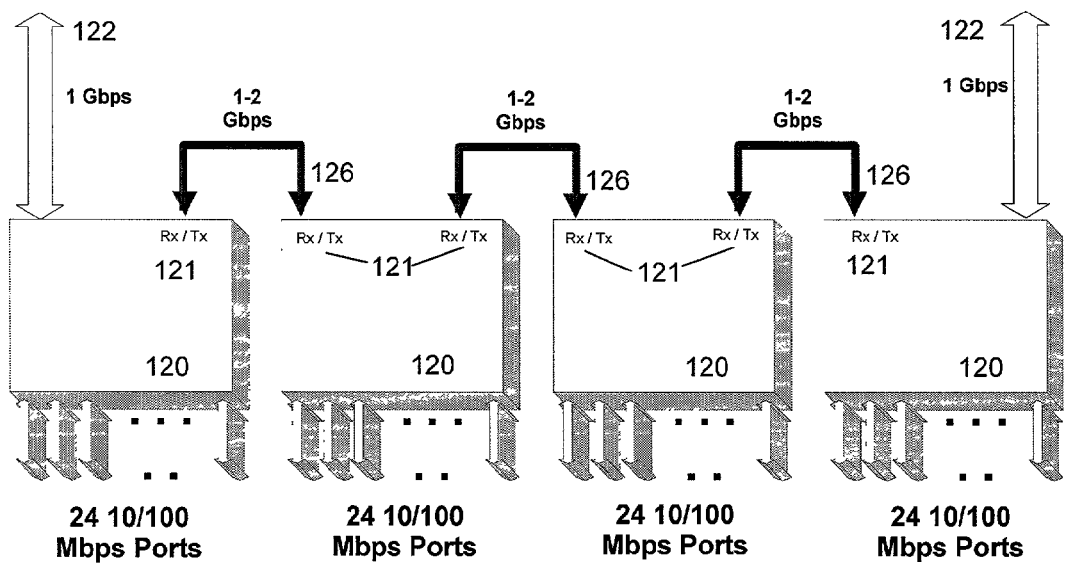
FIG. 4 illustrates an example of stacking of switches in a full duplex interconnection.

FIG. 4 shows a stacking solution of 4 SOCs, which are interconnected by bi-directional gigabit links of full-duplex links 126. In this configuration, except for the first and last modules, both of the Gigabit ports in the intermediate modules will have to be configured as stacking ports in full-duplex interconnection. This type of interconnection allows only the Gigabit ports at the end modules to be used for uplink connectivity but has the benefit of bi-directional flow.

Unlike the simplex interconnection, the packet flow depends on where the destination port resides. From a switch module, the packet could go either direction along the interconnection depending on the destination port. While this interconnection provides extra bandwidth between modules, additional Gigabit ports are not available except at the end switch modules.

In the following sections, the stacking behavior specific to the simplex interconnection, which is a preferred method of connectivity between the switch modules, will be described. It is understood that the duplex interconnection of stacked devices results in similar behavior. Specifically, the Layer 3 operation is described in detail.

When a packet arrives on one of the ports, the ingress logic determines whether the packet needs to be L2 switched or L3 switched. If the packet arrives with the DA MAC address of that of the Router interface, the packet will be L3 switched. If the destination IP address is another module, then the packet is sent on the Stacking link after packet modification. The packet is then L2 switched to the final destination module and again L2 switched to the egress port within the final module.

The following rules are followed for the L3 stacking solution. When two stations, belonging to two different VLANs, are sending packets to each other and both the stations are within the same module, the packet is not sent on the stacking link. When two stations belonging to two different VLANs are sending packets to each other and the two stations are in different switch module, the packet is sent on the stacking link to all the modules. All packets are tagged on the Stacking link with VLAN tag and Broadcom proprietary tag. All Stacking link ports should be configured to be members of all VLANs.

Figure 5:
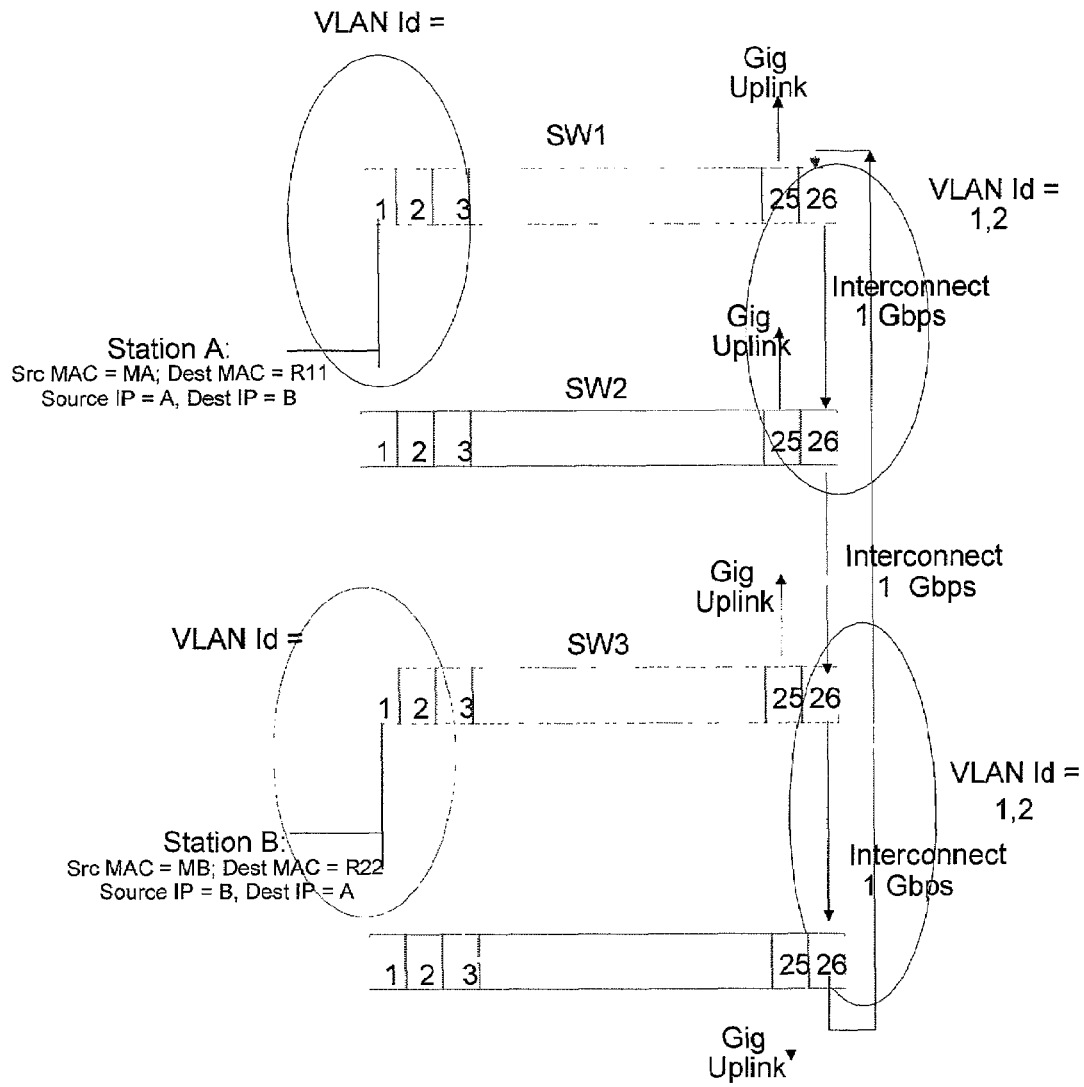
FIG. 5 illustrates a configuration of modules illustrating Layer 3 switching.

FIG. 5 illustrates L3 address learning and forwarding across the stack. Station A on port 1 in SW1 sends a packet to station B on port 1 in SW3. Station A is on port 1 in VLAN 1 in SW1 and Station B is on port 1 in VLAN 2 in SW3. It is also assumed that IP addresses A and B are not learnt in the L3 Table.

A Packet arrives on port 1 in SW1 with DestIP=B, Src MAC Address=MA and DA with that of the Router interface address R11. MAC address MA is learnt in SW1 on source lookup failure as shown in Table 1. L3 lookup for the DestIP=B will be a miss in the L3 Table and in the DEFIP Table. The packet is sent to CPU. CPU populates the L3 table with the Src IP Address A as shown in Table 1.

TABLE 1

| IP Address | Port Number | Next hop MAC Address | MAC Address of Router Interface | VLAN Id |
|---|---|---|---|---|
| A | 1 | MA | R11 | 1 |
| B | 26 | MB | R12 | 2 |

The CPU in SW1 will then do an ARP request for Destination IP address B to all the ports. Station B in SW3 will do an reply with MAC address of Station B. CPU on SW1 will populate the IP address B as shown in Table 2. CPU will also populate the ARL Table with MAC address of R11 with the L3 bit set and the ST bit set to indicate that it is a Static entry in Table 2. CPU should also insure that the source MAC address (MA and MB) is learnt in all the ARL Table of all the switch modules with ST=1.

TABLE 2

| VLAN ID | Mac Address | Port Number | ST | L3 |
|---|---|---|---|---|
| 1 | MA | 1 | 1 | 0 |
| 1 | R11 | 27 | 1 | 1 |
| 2 | MB | 26 | 1 | 0 |

CPU in SW1 will L3 switch the packet and the packet is modified as follows. Dest MAC address=MB, VLAN ID=2, Src MAC address=R12. The Stack Count is set to 3 (since there are 4 modules). Packet is sent on the Stacking link (i.e. port 26 in this example). Packet arrives on port 26 in SW2. Stack Count is decrement by 1 (now 2). In SW2, a source lookup of Source MAC address is a failure. Therefore the Source MAC address R12 is learnt as shown in Table 3. DA lookup of MAC address MB indicates that the packet should be sent on port 26. Packet is sent on the Stacking link.

TABLE 3

| VLAN ID | Mac Address | Port Number | ST | L3 |
|---|---|---|---|---|
| 2 | R12 | 26 | 0 | 0 |
| 2 | MB | 26 | 1 | 0 |

The Packet arrives on port 26 in SW3. Stack Count is decrement by 1 (now 1). In SW3, a source lookup of Source MAC address is a failure. Therefore the Source MAC address R12 is learnt as shown in Table 4. DA lookup of MAC address indicates that the packet should be sent on port 1. Station A receives the packet. Packet is also sent on the Stacking link.

TABLE 4

| VLAN ID | Mac Address | Port Number | ST | L3 |
|---|---|---|---|---|
| 2 | R12 | 26 | 0 | 0 |
| 2 | MB | 1 | 1 | 0 |

The Packet arrives on port 26 in SW4. Stack Count is decrement by 1 (now 0) In SW4, a source lookup of Source MAC address is a failure. Therefore the Source MAC address R12 is learnt as shown in Table 5. DA lookup of MAC address MB indicates port 26. However, the packet is not sent on Stacking link (port 26) since Stack Count is 0.

TABLE 5

| VLAN ID | Mac Address | Port Number | ST | L3 |
|---|---|---|---|---|
| 2 | R12 | 26 | 0 | 0 |
| 2 | MB | 26 | 1 | 0 |

Now consider if Station B on port 1 in SW3 sends a packet to station A on port 1 in SW1. Packet arrives on port 1 in SW3 with DestIP=A, Src MAC Address=MB and DA with that of the Router interface address R22. MAC address MB is learnt in SW3 on source lookup failure as shown in Table 6. L3 lookup for the DestIP=A will be a miss in the L3 Table and in the DEFIP Table. The packet is sent to CPU. The CPU populates the L3 table with the Src IP Address B as shown in Table 6.

TABLE 6

| IP Address | Port Number | Next hop MAC Address | MAC Address of Router Interface | VLAN Id |
|---|---|---|---|---|
| B | 1 | MB | R22 | 2 |
| A | 26 | MA | R21 | 1 |

CPU in SW3 will then do an ARP request for Destination IP address A to all the ports. Station A in SW1 will do an reply with MAC address of Station A. CPU on SW3 will populate the IP address A as shown in Table 6. CPU will also populate the ARL Table with MAC address of R22 with the ST bit set to indicate that it is a Static entry as shown in Table 7.

TABLE 7

| VLAN ID | Mac Address | Port Number | ST | L3 |
|---|---|---|---|---|
| 2 | R12 | 26 | 0 | 0 |
| 2 | MB | 1 | 1 | 0 |

TABLE 7-continued

| VLAN ID | Mac Address | Port Number | ST | L3 |
|---|---|---|---|---|
| 2 | R22 | 27 | 1 | 1 |
| 1 | MA | 26 | 0 | 0 |

CPU in SW3 will L3 switch the packet and the packet is modified as follows. Dest MAC address=MA, VLAN ID=1, Src MAC address=R21. The Stack Count is set to 3 (since there are 4 modules). Packet is sent on the Stacking link (i.e. port 26 in this example). Packet arrives on port 26 in SW4. Stack Count is decrement by 1 now 2). In SW4, a source lookup of Source MAC R21 address is a failure. Therefore the Source MAC address R21 is learnt as shown in Table 8. DA lookup of MAC address indicates port 26. So packet is sent on Stacking link.

TABLE 8

| VLAN ID | Mac Address | Port Number | ST | L3 |
|---|---|---|---|---|
| 2 | R12 | 26 | 0 | 0 |
| 2 | MB | 26 | 1 | 0 |
| 1 | R21 | 26 | 0 | 0 |
| 1 | MA | 26 | 1 | 0 |

Packet arrives on port 26 in SWb1. Stack Count is decrement (now 1). In SW1, a source lookup of Source MAC R21 address is a failure. Therefore the Source MAC address R21 is learnt as shown in Table 9. DA lookup of MAC address MA indicates that the packet should be sent on 1. Station A receives the packet. Packet is also sent on Stacking link.

TABLE 9

| VLAN ID | Mac Address | Port Number | ST | L3 |
|---|---|---|---|---|
| 1 | MA | 1 | 1 | 0 |
| 1 | R11 | 27 | 1 | 1 |
| 2 | MB | 26 | 1 | 0 |
| 1 | R21 | 26 | 0 | 0 |

Packet is received on port 26 in SW2. Stack Count is decrement by 1 (now 0). In SW2, a source lookup of Source MAC R21 address is a failure. Therefore the Source MAC address R21 is learnt as shown in Table 10. DA lookup of MAC address MA indicates port 26. However, packet is not sent on Stacking link since Stack Count is 0.

TABLE 10

| VLAN ID | Mac Address | Port Number | ST | L3 |
|---|---|---|---|---|
| 2 | R12 | 26 | 0 | 0 |
| 2 | MB | 26 | 1 | 0 |
| 1 | R21 | 26 | 0 | 0 |
| 1 | MA | 26 | 1 | 0 |

Next, Station A sends a packet to Station B after addresses are learnt (L3). Port 1 in SW1 receives a packet addressed to the Router interface R11 with IP Dest Address=B. ARL Table search for DA=R11 has L3 bit set. Packet needs to be L3 switched. L3 Table lookup for Source IP=B is a hit. Packet is modified with Source MAC Address=R12, DA=MB. Packet is sent on Port 26 after TTL decrement and IP Header Checksum calculation and L2 CRC calculation. Stack Count is set to 3. Packet arrives on port 26 in SW2. Decrement Stack Count by 1 (now 2). Source Address of R12 is already learnt. DA lookup of MB indicates Port 26. Packet is L2 switched to port 26. Packet arrives on port 26 in SW3. Decrement Stack Count by 1 (now 1). Source Address of R12 is already learnt. DA lookup of MB indicates Port 1. Packet is L2 switched to port 1. Since Stack Count is not zero, packet is also sent on the Stacking link (Port 26). Packet arrives on port 26 in SW4. Decrement Stack Count by 1 (now 0). Source Address of R12 is already learnt. DA lookup of MB indicates Port 26. Since Stack Count is zero, packet is not so sent on the Stacking link.

In general, the Layer 3 switching of the packet would involve crossing VLAN boundaries within the module, followed by bridging across the modules. This has the advantage that the TTL in the IP Header is decrement only once in the entire stack even though the packet traverses through multiple modules.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A method of handling data packets in a series of network switches, said method comprising the steps of:
   receiving an incoming data packet at a data port of a first switch of said series of network switches;
   resolving a stack tag from a header of said incoming data packet;
   determining whether said incoming data packet is a unicast packet, a multicast packet or an IP multicast packet; and to search the address resolution lookup and layer three IP lookup tables to find an egress port for said incoming data packet;
   modifying the header of said incoming packet;
   forwarding said incoming data packet to a second switch of said series of network switches on a stacked connection operating at a first data rate, or to a third switch of said series of switches on a separate connection operating at a second data rate that is different from the first data rate, based on the stack tag and the egress port; and
   remodifying the header of said incoming packet only when the egress port is one of a series of data ports of a particular switch of said series of switches.

2. A method of handling data packets as recited in claim 1, wherein said step of modifying the header of said incoming packet comprises adding or removing a module header to or from said header to be evaluated by said particular switch.

3. A method of handling data packets as recited in claim 1, further comprising the steps of:
resolving a mirroring field of said incoming data packet;
forwarding said incoming data packet to a mirroring port based on said mirroring field.

4. A network switch for network communications, said network switch comprising:
a first data port interface, said first data port interface supporting at least one data port transmitting and receiving data at a first data rate;
a second data port interface, said second data port interface supporting at least one data port transmitting and receiving data at a second data rate, different from the first data rate;
a memory communicating with said first data port interface and said second data port interface;
a memory management unit, said memory management unit for communicating data from said first data port interface and said second data port interface and said memory; and
a communication channel, with the communication channel communicating data and messaging information between said first data port interface, said second data port interface, and said memory management unit,
wherein said first data port interface is configured to communicate with a second switch at said first data rate and said second data port interface is configured to communicate with a third switch at said second data rate and said network switch is configured to resolve a stack tag from a header of an incoming data packet and forwards the incoming data packet to one of said second and third switches based on the resolved stack tag.

5. A network switch as recited in claim 4, wherein said network switch is configured to modify said header of said incoming data packet before forwarding the incoming data packet to another switch.

6. A network switch in a series of network switches comprising:
means for receiving an incoming data packet at a data port of a first switch of said series of network switches;
means for resolving a stack tag from a header of said incoming data packet;
means for determining whether said incoming data packet is a unicast packet, a multicast packet or an IP multicast packet; and to search the address resolution lookup and layer three IP lookup tables to find an egress port for said incoming data packet;
means for forwarding said incoming data packet to at least a second switch of said series of network switches on a stacked connection operating at a first data rate, or to a third switch of said series of switches on a separate connection operating at a second data rate that is different from the first data rate, based on the stack tag and the egress port; and
means for modifying the header of said incoming packet only when the egress port is one of a series of data ports of a particular switch of said series of switches.

7. A network switch in a series of network switches as recited in claim 6, wherein said means for modifying the header of said incoming packet comprises means for adding or removing a module header to or from said header to be evaluated by said particular switch.

8. A network switch in a series of network switches as recited in claim 6, further comprising:
means for resolving a mirroring field of said incoming data packet;
means for forwarding said incoming data packet to a mirroring port based on said mirroring field.

* * * * *

UNITED STATES PATENT AND TRADEMARK OFFICE
CERTIFICATE OF CORRECTION

PATENT NO.         : 7,099,315 B2
APPLICATION NO.    : 09/955985
DATED              : August 29, 2006
INVENTOR(S)        : Shekhar Ambe and Mohan Kalkunte It is certified that error appears in the above-identified patent and that said Letters Patent is hereby corrected as shown below:

On the Title Page of the Patent, Item (60) Related U.S. Application Data is missing.

Item (60):

The Related U.S. Application Data should read as follows:

Provisional application No. 60/234,156, filed on September 20, 2000.

Signed and Sealed this

Fifth Day of December, 2006

JON W. DUDAS
*Director of the United States Patent and Trademark Office*